United States Patent [19]
Mortimer

[11] Patent Number: 4,785,919
[45] Date of Patent: Nov. 22, 1988

[54] ROTARY FLYWHEEL SKID SENSING MEANS FOR VEHICLE HYDRAULIC BRAKING SYSTEMS

[75] Inventor: Ivan Mortimer, West Midlands, England

[73] Assignee: Lucas Industries Public Limited Company, England

[21] Appl. No.: 78,044

[22] Filed: Jul. 27, 1987

[30] Foreign Application Priority Data

Aug. 8, 1986 [GB] United Kingdom ............... 8619418

[51] Int. Cl.⁴ .............................................. B60T 8/34
[52] U.S. Cl. .............................................. 188/181 A
[58] Field of Search ............ 188/180, 181 R, 181 A, 188/181 C; 303/112, 113, 117

[56] References Cited
U.S. PATENT DOCUMENTS 3,542,167 11/1970 Wilson ........................... 188/181 A

FOREIGN PATENT DOCUMENTS 0081858 4/1986 Japan .............................. 188/181 A
2070166 9/1981 United Kingdom .......... 188/181 A Primary Examiner—Duane A. Reger
Attorney, Agent, or Firm—Laff, Whitesel, Conte & Saret

[57] ABSTRACT

In a rotary flywheel skid sensing device for a vehicle hydraulic braking system a flywheel assembly is driven from a braked wheel, and has a flywheel member, a reaction member and a ball and ramp mechanism co-operating with the two members and operative, on relative angular movement of the members when the deceleration of the braked wheel exceeds a predetermined value, to cause relative axial movement of the members to actuate means for modulating the brake pressure. The flywheel assembly is driven by and located on a collar driven by the wheel, with the ball and ramp mechanism located in complementary conical surfaces on the flywheel and reaction members. The reaction member is supported on the collar to locate the assembly rotationally and axially, and drive is transmitted from the collar to the assembly through a clutch provided by a direct engagement between the collar and the reaction member.

6 Claims, 3 Drawing Sheets

ROTARY FLYWHEEL SKID SENSING MEANS FOR VEHICLE HYDRAULIC BRAKING SYSTEMS This invention relates to a rotary flywheel skid sensing means for a vehicle hydraulic braking system of the kind comprising a flywheel assembly adapted to be driven through clutch means from a wheel to be braked, and including a flywheel member, a reaction member, and a ball and ramp mechanism cooperating with the two members and so constructed and arranged that relative angular movement between the members occurring when the deceleration of the braked wheel exceeds a predetermined value causes relative axial movement of the members into an expanded condition to actuate means for modulating the brake pressure, with the clutch means slipping at a predetermined torque so that the two members can continue to rotate together in the expanded condition.

In known rotary flywheel skid sensing means of the kind set forth the flywheel assembly is located on a member driven by the wheel. The driven member has a cylindrical surface on which a complementary surface on the flywheel member fits with a close clearance to support the assembly for rotation, and a surface perpendicular to the axis of rotation of the assembly to support the assembly axially through the clutch means which acts on the reaction member. Thus, drive is transmitted from the wheel to the flywheel member through the driven member, the clutch means, the reaction member and the ball and ramp mechanism. The ball and ramp mechanism has pockets in corresponding surfaces of the flywheel and reaction members in which the balls are located, and although the corresponding surfaces on the two members are perpendicular to the axis of rotation, because of manufacturing tolerances the pockets will not lie in a single plane which is perpendicular to the axis. Thus in operation there will be relative movement between the flywheel and reaction members, and between the driven member and the assembly because of manufacturing tolerances between the various surfaces. To accommodate these movements, articulation means are provided between the driven member and the reaction member, either in the clutch means or as a separate spider member. It can be seen therefore that this construction is complicated, both in manufacture and assembly, which is a disadvantage.

According to our invention, in a rotary flywheel skid sensing means for a vehicle hydraulic braking system of the kind set forth the flywheel assembly is driven by and located on a driven member driven by the wheel, with the ball and ramp mechanism provided between complementary conical surfaces on the flywheel and reaction members, the reaction member is supported on the driven member to locate the assembly rotationally and axially, and the clutch means is provided by direct engagement between the driven member and the reaction member.

Providing the ball and ramp on conical surfaces enables the reaction member rather than the flywheel member to support the assembly for rotation. This means first that the flywheel member is free to move to accommodate relative movement of the flywheel and reaction members, and second that the support surfaces are all on the reaction member and driven member, so it is easier to make these more accurately, and there are fewer tolerances to accommodate. As a result, the articulation means are not needed, and the clutch means can be provided by engagement between the driven and reaction members. The construction of the assembly is therefore much simpler, and easier to manufacture.

The driven member and the reaction member have the usual complementary cylindrical surfaces for rotational support of the assembly. Axial support is preferably provided by complementary conical surfaces on the members, with the clutch means provided by the engagement between these conical surfaces to transmit drive to the assembly.

Conveniently, the reaction member has a bearing collar on which the surfaces are provided. The driven member may comprise a collar.

Preferably, the complementary conical surfaces between which the ball and ramp mechanism is located are at 45° to the axis of rotation of the assembly.

An embodiment of our invention is shown by way of example in the accompanying drawings, in which.

Figure 1:
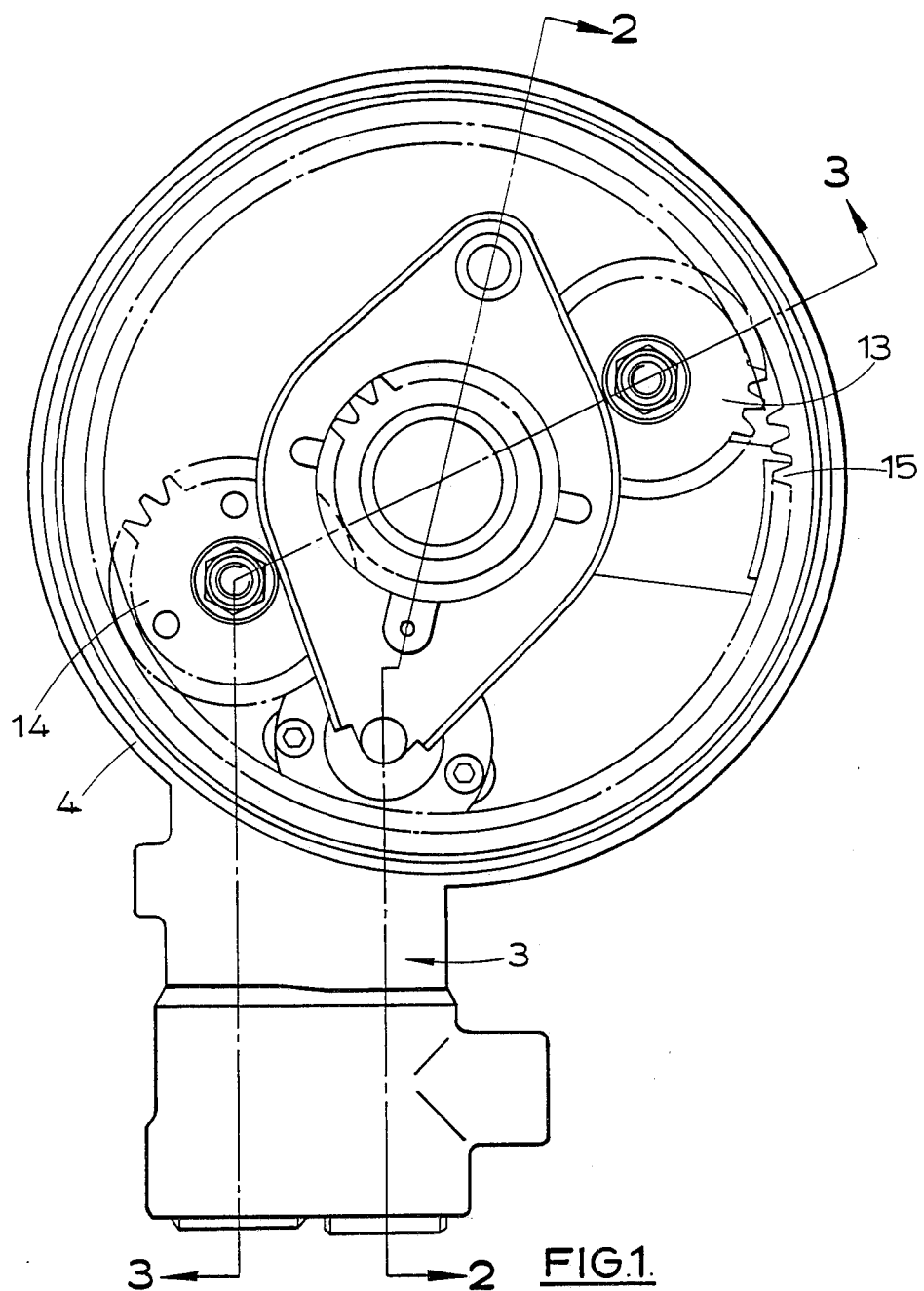
FIG. 1 is an end view of a modulator assembly for an anti-skid hydraulic braking system for a vehicle.
Figure 2:
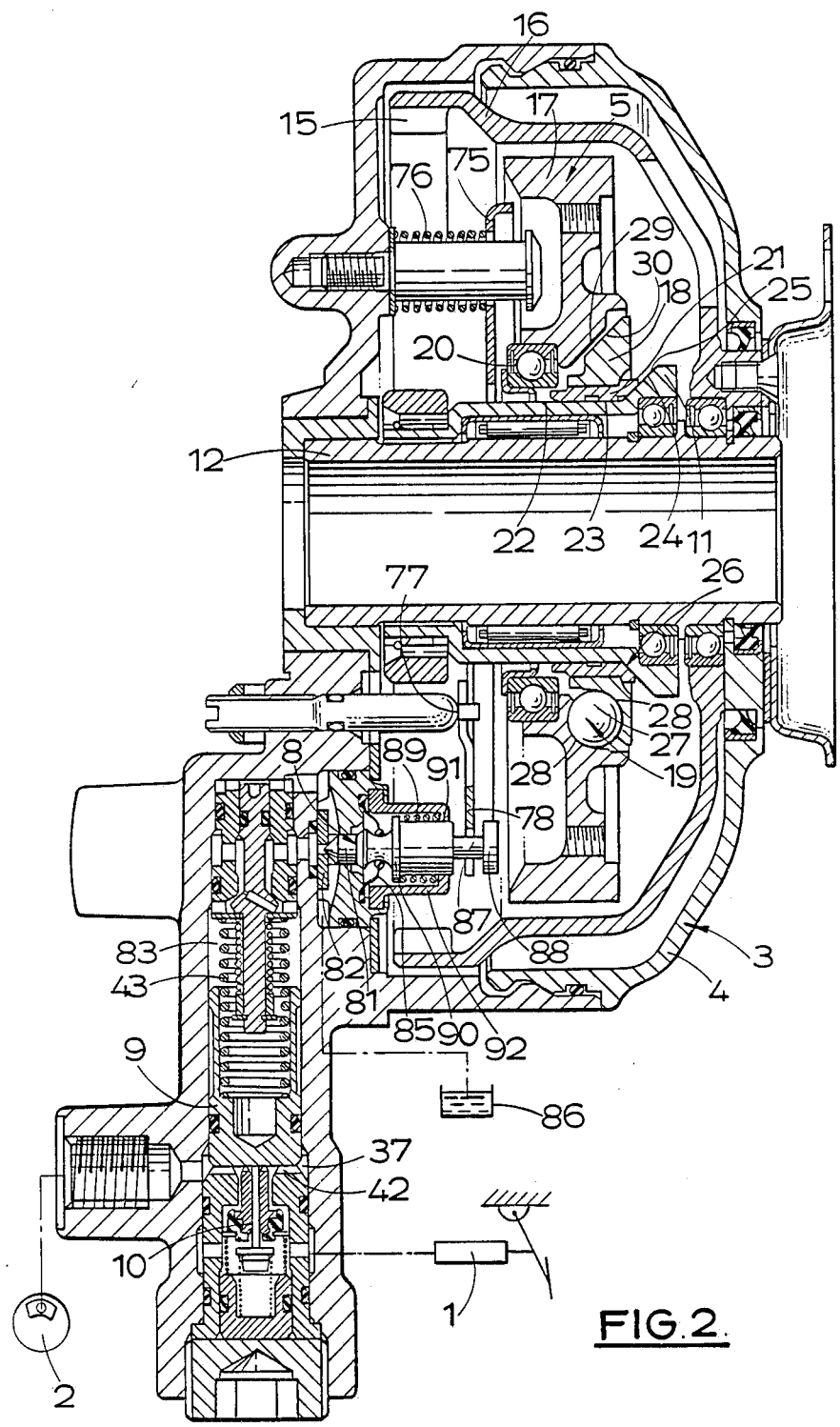
FIG. 2 is a section on the line 2—2 of FIG. 1.
Figure 3:
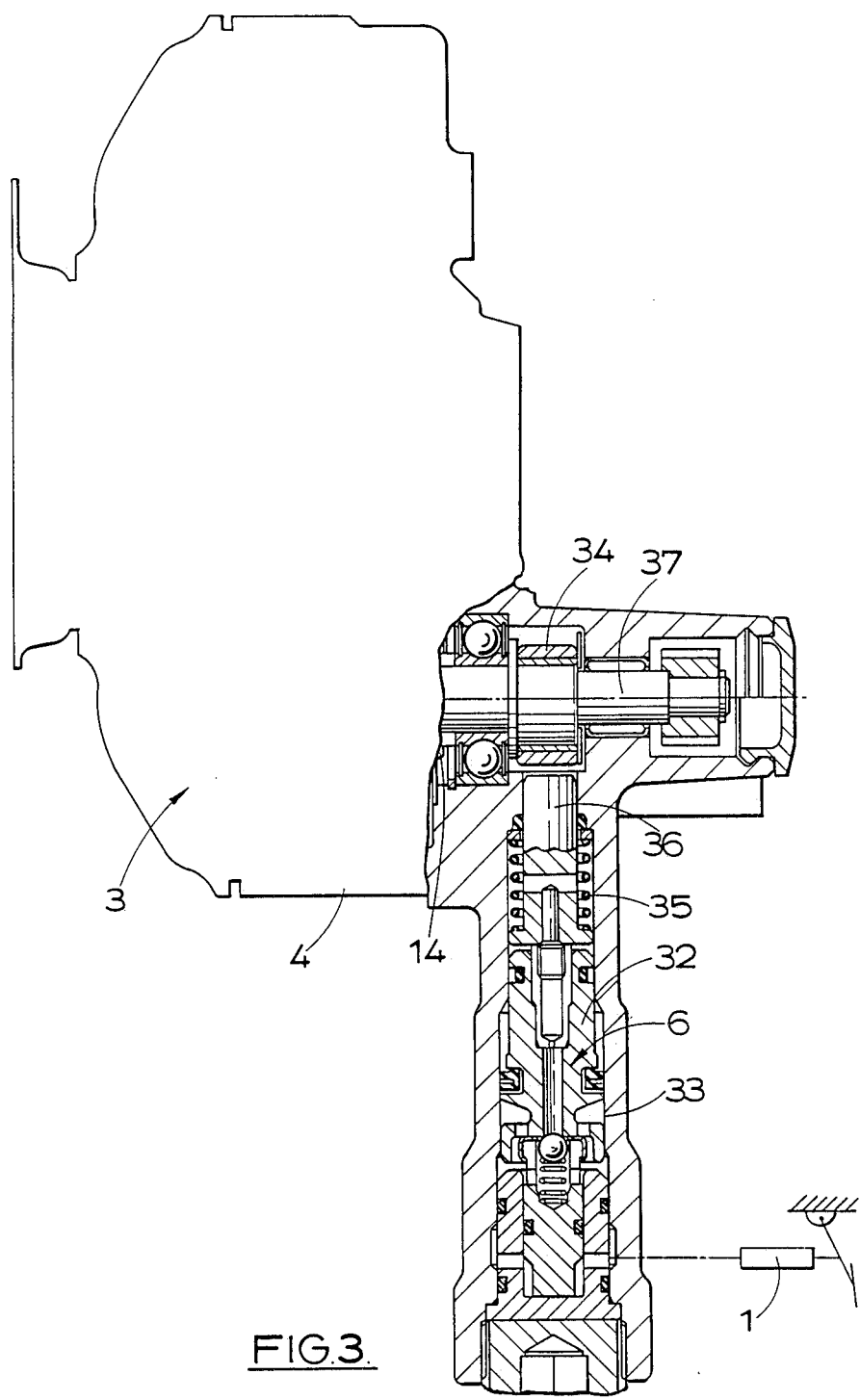
FIG. 3 is a section on the line 3—3 of FIG. 1.

The anti-skid system illustrated in the drawings comprises a pedal-operated hydraulic master cylinder 1 for operating a wheel brake 2, and a modulator assembly 3. The modulator assembly comprises a casing 4 in which is incorporated a flyheel assembly 5, a pump 6, a dump valve 8, an expander piston 9 and an isolating valve 10.

The flywheel assembly 5 is driven from a collar 11 which is journalled on a hollow shaft 12 through which extends a shaft (not shown) supporting a wheel to be braked by the brake 2. The collar 11 is driven from the wheel through idler pinions 13, 14, and internal teeth 15 on a flange 16 rotatable with the wheel. The flywheel assembly 5 has a flywheel member 17, a reaction member 18, and a ball and ramp mechanism 19 cooperating with the two members, and is located by a bearing 20 and cooperation of the reaction member 18 and the collar 11. The reaction member 18 includes a bearing collar 21 for cooperation with the collar 11. The collar 11 has a cylindrical surface 22 on which a complementary surface 23 on the bearing collar 21 fits with a close clearance to support the assembly 5 for rotation (along with bearing 20). The collar 11 also has a conical surface 24 with which a complementary surface 25 on the bearing collar 21 engages to locate the assembly 5 axially. The engagement between the surfaces 24, 25 also provides a clutch 26, so that drive is transmitted from the collar 11 to the flywheel member 17 through the clutch 26, reaction member 18 and ball and ramp mechanism 19.

The ball and ramp mechanism has balls 27, suitably three in number housed in angularly spaced pockets 28 in complementary conical surfaces 29, 30 on the flywheel and reaction members respectively. The edges of the pockets 28 define ramps up which the balls 27 are adapted to ride upon relative rotation of the flywheel and reaction members 17, 18, to move the flywheel member 17 axially away from the reaction member 18. Any relative movement of the flywheel and reaction members caused by inaccuracies in the machining of the pockets 28 can be accommodated by movement of the fylwheel member 17, which is constrained only by the bearing 20 and the mechanism 19.

The pump 6 comprises a plunger 32 which is housed in a longitudinal bore 33 of stepped outline in the casing 4. The inner end of the plunger 32 works through the portion of the bore 33 which is of smallest diameter. A tappet 36 for operating the plunger is held away from an eccentric drive portion 34 on a shaft 37 by a compression spring 35, and the shaft 37 is driven by the pinion.

An expander chamber 39 is defined in a bore between the expander piston 9 and the valve 10. The expander piston 9 is normally urged into engagement with a shoulder 42 by means of a compression spring 43 and in this position, the effective volume of the chamber 39 is at a minimum.

The dump valve 8 comprises a valve member 81 engageable with a seating 82 surrounding a port which communicates at its opposite inner end with a support chamber 83 in which the spring 43 is housed. The valve member 81 comprises a piston guided to slide in a bore and mounted on a diaphragm 85 which seals the valve member 81 in the bore. A chamber 84 between the port and the piston is connected to a reservoir 86. The piston includes a stem 87 of reduced diameter with an enlarged head 88 being carried by its outer end.

In a closed position the valve member 81 is urged into engagement with the seating 82 by means of a compression spring 89 which surrounds a portion of the piston on the outer side of the diaphragm 85 and is caged between complementary shoulders 90 and 91 on the piston and in a casing 92 in which the valve member 81 is accommodated. This isolates the port from the reservoir 86.

The dump valve 8 is operated by a lever 75 with which the flywheel assembly 5 is adapted to co-operate. As illustrated, the lever 75 co-operates with the end of the flywheel member 17 which is remote from the reaction member 18. The lever 75 is biassed towards the flywheel member 17 by means of a compression spring 76 which acts on one end of the lever 75 in turn to urge a portion of the lever 75 into engagement with a fulcrum 77 on the housing.

A bifurcated portion 78 at the free end of the lever 75 remote from the spring 76 receives the stem 87 so that the lever is disposed between the piston and the head 88. The lost-motion between the lever 75 and the head 88 means that any vibrational movement of the the flywheel assembly 5 is not transmitted to the valve member 81, so that no vibrational movement of the valve member 81 relative to the seating 82 will occur.

When the master cylinder 1 is operated to apply the brake 2, fluid under pressure flows to the brake 2 through the open isolating valve 10.

Under such conditions the shaft 37 rotates freely with the tappet 36 urged out of co-operation with the eccentric 34 by means of the spring 35. The flywheel assembly 5 rotates, being driven by the clutch 26, and the flywheel member 17 and the reaction member 18 both rotate together due to the location of the balls 27 in the pockets 28.

For normal decelerations of the braked wheel the force in the spring 76 holds the flywheel assembly in the contracted position shown. However, should the braked wheel pass onto a slippery surface, the braked wheel will decelerate rapidly accompanied by a similar deceleration of the collar 11 and the reaction member 18. Due to its inertia the flywheel member 17 will continue to rotate at a greater speed, and the torque thus generated causes the balls 27 to ride up the ramps defined by the pockets 28 overcoming the force in the spring 76, with the relative angular movement of the flywheel member 17 and the reaction member 18 being accompanied by axial movement of the flywheel member 17 away from the reaction member 18. At the extent of the movement of the balls 27 up the ramps, the flywheel member 17 and the reaction member 18 are in an expanded condition and both overrun relative to the collar 11 with the clutch 26 slipping. Expansion of the flywheel assembly 5 applies a force to the lever 75, causing it to pivot about the fulcrum 77. This action opens the dump valve 8 by the lever 75 taking up the lost-motion to engage the head 88 and withdraw the valve member 81 away from the seating 82 against the force in the compression spring 89.

Opening the dump valve 8 returns fluid to the reservoir 86 from the chamber 83. This enables the expander piston 9 to retract, in turn permitting the isolating valve 10 to close and increasing the volume of the chamber 39 which relieves the pressure applied to the brake 2. In addition the plunger 32 is unbalanced since the pumping chamber is in communication with the chamber 83. Thus the tappet 36 is permitted to move towards the cam 34, whereby operation of the pump 6 is initiated. Thereafter the plunger 32 oscillates to draw fluid from the reservoir 86 and pump it back into the chamber 83.

When the speed of the roadwheel recovers at the termination of the skid following brake release, the collar 11 accelerates and when it reaches the speed of the flywheel member 17, the flywheel assembly 5 contracts, with the balls 27 running down the ramps. This movement of the flywheel assembly 5 is accompanied by a corresponding movement of the lever 75 about the fulcrum 77 to permit the dump valve 8 to close, signifying the termination of the skid signal, and the lever 75 returns to the initial position with the degree of lost-motion re-established. The brake 2 is thereafter re-applied by the flow of fluid from the pump 6 which advances the expander piston 9 in its bore to supply pressure fluid to the brakes.

It will be noted that the construction of the flywheel assembly 5 and the clutch means 26 is simple and easy to manufacture. The conical surfaces on the flywheel and reaction members are angled at 45° to the axis of rotation of the flywheel assembly 5, but may be at any other convenient angle.

I claim:

1. A rotary flywheel skid sensing means for an hydraulic braking system for a vehicle having a wheel adapted to be braked, comprising means for modulating the supply of brake pressure to said brake, a flywheel assembly, clutch means through which said flywheel assembly is adapted to be driven from said wheel, and a driven member, adapted to be driven by said wheel, upon which said flywheel assembly is located and from which said flywheel assembly is adapted to be driven, said flywheel assembly comprising a flywheel member, a reaction member, and a ball and ramp mechanism co-operating with both said flywheel member and said reaction member, said ball and ramp mechanism being responsive to the relative angular movement between said flywheel and reaction members which occurs when the deceleration of said braked wheel exceeds a predetermined value to cause relative axial movement between said flywheel and reaction members to urge said ball and ramp mechanism into an expanded condition to actuate in turn said means for modulating said brake pressure, with said clutch means slipping at a predetermined torque so that said flywheel and reaction members can continue to rotate together in the expanded condition, wherein said flywheel member has a conical surface, said reaction member is provided with a conical surface complementary to said conical surface on said flywheel member, said ball and ramp mechanism is provided between said complementary conical surfaces, said reaction member is supported on said driven member to locate said flywheel assembly both rotationally and axially, and said clutch means is defined by direct engagement between said driven member and said reaction member.

2. Skid sensing means as claimed in claim 1, wherein said clutch means is defined by a direct engagement between complementary conical bearing surfaces.

3. Skid sensing means as claimed in claim 2, wherein said driven member and said reaction member are provided with co-operating cylindrical surfaces for supporting the flywheel assembly for rotation, and co-operation of said conical bearing surfaces of said clutch means acts to prevent relative movement between said driven member and said reaction member at least in one direction.

4. Skid sensing means as claimed in claim 3, wherein said reaction member has a bearing collar on which said cylindrical bearing surface and said conical surface are both provided.

5. Skid sensing means as claimed in claim 1, wherein said driven member comprises a collar.

6. Skid sensing means as claimed in claim 1, wherein said conical surfaces on said flywheel member and said reaction member are at 45° to the axis of rotation of said flywheel assembly.

* * * * *